United States Patent Office 3,322,994
Patented May 30, 1967

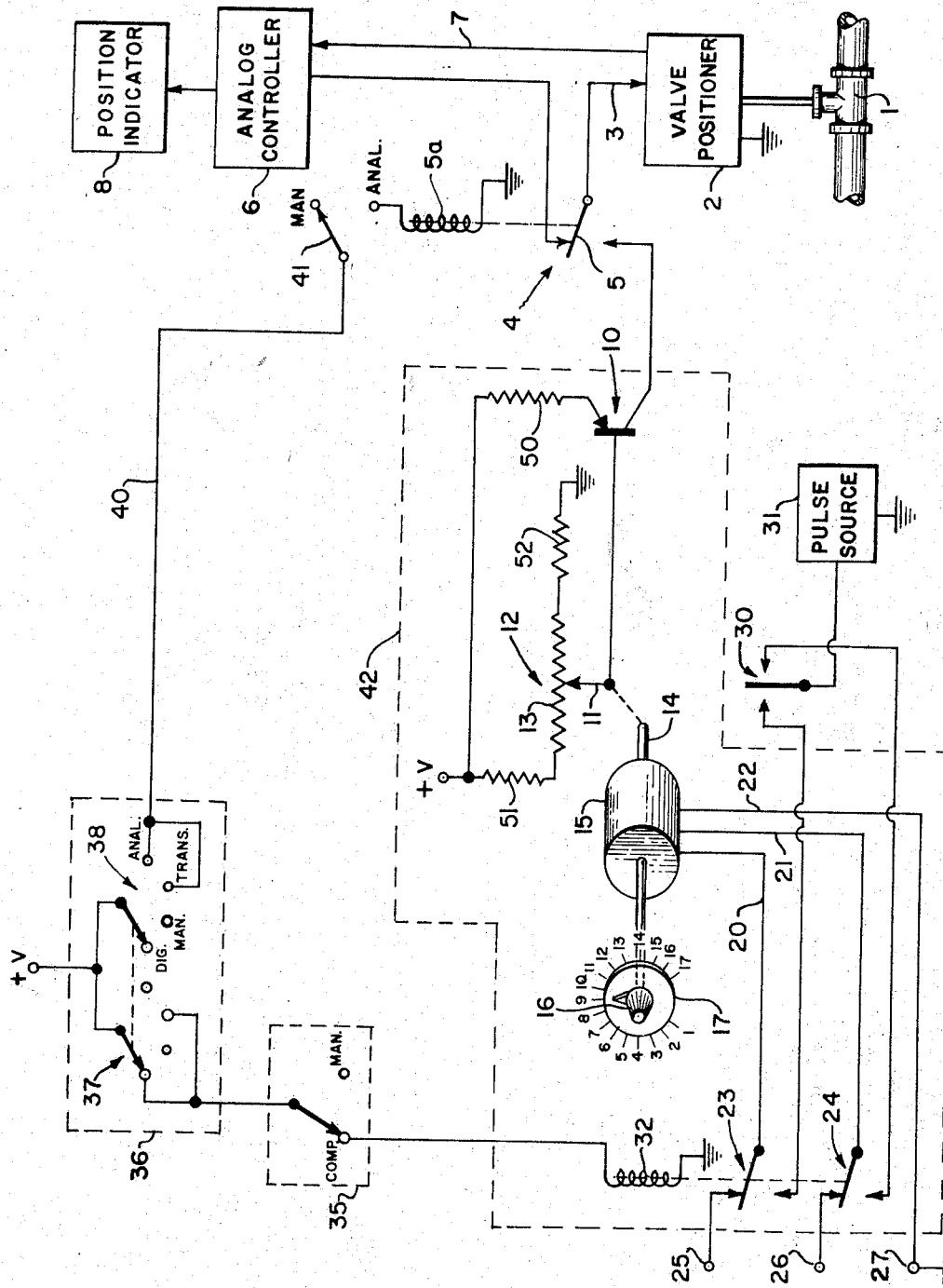

3,322,994
ELECTRICAL APPARATUS INCLUDING ANALOG
AND DIGITAL CONTROL FOR AN ELEMENT
John A. Dever and William F. Newbold, Springfield
Township, Philadelphia, Pa., assignors to Honeywell
Inc., Minneapolis, Minn., a corporation of Delaware
Filed June 8, 1964, Ser. No. 373,162
5 Claims. (Cl. 313—267)

This invention relates to supervisory control systems. More specifically, the present invention relates to a novel combined analog and digital supervisory control device.

An object of the present invention is to provide a novel combined analog and digital supervisory control.

Another object of the present invention is to provide a novel supervisory control for selectively effecting a direct digital computer control operation of a governed device.

Still another object of the present invention is to provide a novel supervisory control having a smooth transition between an analog operation and a digital operation.

A further object of the present invention is to provide a novel combined analog and digital supervisory control having manual means to effect an emergency supervisory control.

A still further object of the present invention is to provide a novel supervisory control, as set forth herein, having a simple operation and construction.

In accomplishing these and other objects, there has been provided, in accordance with the present invention, a combined analog and digital supervisory control having a stepping motor responsive to digital computer signals in a digital mode of operation. The stepping motor is used to adjust a control signal for a controlled device. A manual control is provided for the stepping motor to effect a manual supervisory control. An analog controller is arranged to operate the controlled device in an analog mode of operation. Switching means are provided to selectively apply either the digital control signal or the analog control signal to the controlled device while effecting a smooth transfer between the digital and analog control operations.

A better understanding of the present invention may be had when the following detailed description is read in connection with the accompanying drawing in which the single figure is a schematic illustration of an analog and digital supervisory control system embodying the present invention.

Referring now to the single figure drawing, there is shown a combined analog and digital supervisory control apparatus for controlling the position of a controlled element, such as a valve device 1. The valve 1 is positioned by a valve positioner mechanism 2 which is effective to control the valve position in response to a control signal applied thereto along line 3. The control signal is controlled by a relay controlled switch 4 comprising a single-pole, double-throw switch 5 and a relay coil 5a. A moving arm of the switch 5 is connected to the valve positioner 2 to apply an actuating signal thereto. A stationary contact of switch 5 is connected to an output circuit of an analog controller apparatus 6 which controller is arranged to provide a valve control signal in response to a predetermined set-point signal. Further, as an option the position of the valve 1 may be supplied to the controller 6 as a position feedback signal along a line 7. The controller 6 is used to apply a signal representative of a valve position to a position indicator 8 to provide a visual readout of the controller operation.

The other stationary contact of switch 5 is connected to the collector electrode of a transistor 10. The emitter electrode of the transistor 10 is connected through a resistor 50 to an energizing source +V. The base electrode is supplied with a control signal from the sliding contact 11 of a potentiometer 12. The resistance element 13 of the potentiometer 12 is connected between the source +V and a ground return point via resistors 51 and 52 respectively.

The contact 11 is mechanically coupled for actuation thereby to the rotatable output shaft 14 of a stepping motor 15. The shaft 14 is also provided with a knob 16 thereon for manual rotation of the shaft 14. The knob 16 is arranged to cooperate with a scale 17 which is calibrated in valve positions. The motor 15 is energized by pulse, or digital, signals applied along lines 20, 21 and 22. Lines 20 and 21 are connected to respective moving contacts of a pair of ganged, solenoid-operated switches 23 and 24. The switches 23 and 24 are each single-pole, double-throw switches with one stationary contact connected to a pulse signal terminal; i.e., switch 23 is connected to a first input terminal 25 and switch 24 is connected to a second input terminal 26. A third input terminal 27 is connected to ground and directly to line 22. The other stationary contact of switch 23 is connected to a first stationary contact of a manually-operated single-pole, double-throw switch 30. The second stationary contact of switch 30 is connected to the other stationary contact of switch 24. The movable contact of switch 30 is arranged in a center-off configuration and is connected to pulse source 31.

The solenoid 32 for operating switches 23 and 24 is controlled by the joint operation of a pair of switches 35 and 36. These switches are effective to selectively connect the solenoid 32 to an energizing source +V. Switch 35 is a single-pole, double-throw type having its stationary contacts identified as Computer and Manual, respectively. The Computer contact is connected to the solenoid 32 while the Manual contact is left unconnected. The moving contact of switch 35 is connected to a stationary contact of a master switch means 36. Master switch means 36 in this embodiment comprises a pair of ganged, manually-operated, four-position switches 37 and 38. The moving contacts of both switches are connnected to the source +V. The four stationary contacts of both switches 37 and 38 are respectively labeled Digital, Manual, Transfer and Analog. The moving contact of switch 35 is connected to the Digital contact of switch 37. The Digital and Transfer contacts of switch 37 are connected together while the Manual and Analog contacts are left unconnected. The Digital and Manual contacts of switch 38 are left unconnected, and the Transfer and Analog contacts are connected together. Additionally, the Transfer and Analog contacts of switch 38 are connected by a line 40 to the moving arm of a single-pole, double-throw switch 41. The stationary contacts of switch 41 are labeled respectively "Manual" and "Analog." The Manual contact is unconnected while the Analog contact is connected to one end of the relay coil 5a to apply an energizing signal thereto. A number of the elements mentioned above may be arranged as physically-adjacent units in a supervisory station assembly 42; e.g., the motor 15 and related devices may be mounted on a common chassis with the switches 23, 24 and 35 as a Digital-Manual station. The switch 30 and source 31 may be remotely mounted; e.g., in proximity to the indicator 8 and the switch 4. Other arrangements of these units and other ones of the aforesaid elements may be utilized without modifying the operation of the present invention.

In operation, the supervisory control of the present invention is effective to provide direct digital control of a process device; e.g., a valve, while allowing a selective changeover to manual or automatic analog control. The input terminals 25, 26 and 27 are connected to a source of digital control signals, such as a digital computer. These signals are applied to lines 20, 21 and 22 when switches 23 and 24 are actuated by the solenoid 32. The solenoid 32 is energized only when switch 35 is in the Computer position and when switch 37 is in either the Digital or Transfer position. These positions of switches 35 and 37 are effective to supply a conducting path from source +V to solenoid 32. The digital signals from the computer are applied to the motor 15 to effect a stepping rotation of shaft 14 in a direction desired by the computer in response to process signals or calculations calling for a certain valve position.

The rotation of shaft 14 is effective to vary the position of the sliding potentiometer contact 11 and the indicating knob 16. The movement of wiper 11 is effective to vary the current supplied by transistor 10. However, the transistor 10 is not connected to a circuit load until switch 4 has been actuated to connect the collector of transistor 10, to the valve positioner 2. Thus, switch 4 is effective to apply the output current from transistor 10 to the valve positioner 2 to control the valve 1.

In the Manual position of switch 41, the aforesaid operation is also available unless master switch means 36 has been placed in the Manual position either in combination or separately with switch 35 to deenergize the solenoid 32. It is to be noted that switch 35 may, also, be utilized alone to interrupt the computer signals by deenergizing the solenoid 32. In the deenergized condition of solenoid 32, the switches 23 and 24 are effective to connect lines 21 and 22 to respective stationary contacts of switch 30. Switch 30 may be operated to either side of a normal center position to connect a pulse source 31 to either one of lines 20 and 21. Depending on the line selected by operation of switch 30, the pulse source 31 is effective to produce a corresponding stepping rotation of the stepping motor 15. Thus, switch 30 may be used to control the base signal on transistor 10 and, ultimately, the position of the valve 1.

The Analog position of switch means 36 is effective to energize the relay coil 5a through the Analog position of switch 41 to route a control signal from controller 6 to the valve positioner 2. The analog controller 6 may optionally be provided with a valve position signal from positioner 2 to produce a valve position indication on the indicator 8 or in a simplified system the indicator 8 may be used to indicate the controller output signal to the positioner 2. Thus, the indicator 8 is arranged to provide a continuous indication of a representation of the valve position. When switch 41 is operated to the Analog position, the controller output signal is applied to the positioner 2 to control the position of valve 1 to bring the controlled process to a predetermined set-point.

When it is desired to transfer the valve control from the analog controller 6 to the digital computer, the switches 37 and 38 are switched to the Transfer position, while switch 35 is placed in the Manual position. In this position, the analog controller 6 is still operating the valve 1. The reading on scale 17 is then compared to the indication on indicator 8. If a discrepancy appears, the motor 15 is advanced either by a direct use of knob 16 or the pulse source 30 through switch 30. After the adjustment of motor 15, switch 41 is shifted to the Manual position while switch means 36 may be left in the Transfer position. The positioner 2 is now controlled by the transistor 10 and is still in its last position. The switch 35 is now thrown to the Computer position to energize relay coil 32 to allow the computer to produce further changes of the position of motor shaft 14. This connection is effective to produce a smooth change from the old analog to the new digitally-controlled valve position. It is to be noted that the computer may be connected to the slider 11 to detect the initial position of the slider 11 in order to effect a digital output to produce a new corrected position.

In the event of failure of the digital computer, the valve 1 can be operated manually by using the knob 16 on stepping motor 15. Further, if either switch 35 or 36 is switched to the Manual position, the pulse source 31 may be selectively connected by switch 30 through switches 23 and 24 to motor 15. In the event that valve control is desired to be transferred to the analog controller 6, the switch 41 is operated to the Analog position and master switch 36 to the Transfer or Analog position. With this combination of switches 36 and 41, the output signal from the controller 6 is applied to the valve positioner 2 through switch 5.

A plurality of subassemblies 42 may be arranged to control a plurality of respective valves. Each of these units 42 may be arranged to change-over from analog to digital operation, as described above, while a single master switch means 36 is arranged to supply the energizing current to a solenoid 32 for each of the units 42. In this arrangement, the switch 35 may be omitted and all the units 42 are concurrently switched to digital operation by actuating switch means 36 to the Transfer position. On the other hand, if it is desired to retain switch 35, it may be associated with each of the assemblies 42 and used to determine which positioner 2 will transfer to digital operation when master switch 36 is operated.

Accordingly, it may be seen that there has been provided, in accordance with the present invention, a combined, analog and digital supervisory control characterized by a smooth transition between an analog control operation and a digital control operation while providing accompanying, manual, supervisory control means operable to effect the aforesaid transition and to provide an emergency control operation.

What is claimed is:

1. A supervisory control apparatus comprising an analog control means operative to provide a control signal to a controlled element to produce a desired operation of said element, digital control means responsive to digital computer output signals to produce a corresponding control signal for said controlled element, manual control means for said digital control means to produce an initial correspondence between the output signals from said digital control means and said analog control means, and switch means operative to selectively apply an output signal from said analog control to said controlled element in an analog mode of operation and an output signal from said digital control means to said controlled element in a digital mode of operation.

2. A supervisory control apparatus as set forth in claim 1 wherein said digital control means includes a stepping motor arranged to be operated by said digital computer output signals to adjust a control signal from said controlled element.

3. A supervisory control apparatus as set forth in claim 2 wherein said manual control means includes a knob mounted on a shaft of said stepping motor and a scale associated with said knob.

4. The combination recited in claim 1 including pulse supplying means, and driving means, said pulse supplying means selectively connected to said driving means for actuation thereof, said pulse supplying means actuating said driving means only when said driving means is disconnected from said digital computer.

5. The combination recited in claim 1 wherein said first control means comprises analog control loop means, said second control means comprises digital computing means, said analog and said digital control means adapted to operate said output means mutually exclusively.

References Cited

UNITED STATES PATENTS

| | | | |
|---|---|---|---|
| 2,740,082 | 3/1956 | Sedgfield | 318—489 |
| 2,947,929 | 8/1960 | Bower | 318—28 |
| 2,950,427 | 8/1960 | Tripp | 313—30 X |
| 3,004,251 | 10/1961 | Rapacz | 340—347 |
| 3,063,311 | 11/1962 | Beckwith et al. | 77—32.2 |
| 3,068,387 | 12/1962 | Koppel | 318—28 |
| 3,077,552 | 3/1963 | Koppel | 318—28 |
| 3,225,277 | 12/1965 | Foulger | 318—138 |

ORIS L. RADER, *Primary Examiner.*

G. SIMMONS, *Assistant Examiner.*